United States Patent [19]

Mikolaizik

[11] Patent Number: 5,439,295
[45] Date of Patent: Aug. 8, 1995

[54] IDLER WHEEL WITH TAPERED SHAFT

[76] Inventor: Daniel J. Mikolaizik, 4063 Knollwood Dr., Grand Blanc, Mich. 48439

[21] Appl. No.: 235,740

[22] Filed: Apr. 29, 1994

[51] Int. Cl.6 .............................................. F16C 27/02
[52] U.S. Cl. .................................... 384/125; 384/296
[58] Field of Search ............... 384/125, 296, 539, 295, 384/220, 271

[56] References Cited

U.S. PATENT DOCUMENTS

| | | | |
|---|---|---|---|
| 3,986,751 | 10/1976 | Diderich | 384/125 |
| 4,749,286 | 6/1988 | White | 384/125 |
| 4,750,886 | 6/1988 | Portelli et al. | 384/125 |
| 5,263,778 | 11/1993 | Jördens et al. | 384/296 |

*Primary Examiner*—Lenard A. Footland
*Attorney, Agent, or Firm*—Jimmy L. Funke

[57] ABSTRACT

An idler wheel assembly is provided which is particularly suitable for manufacture and assembly in mass production. The assembly includes an idler wheel which has a tapered shaft that is sized to closely mate with a similarly sized and shaped bore in a support member. At the distal end of the tapered shaft is one or more resilient retention features which secure the shaft within the bore, yet enables the shaft to freely rotate within the bore such that the idler wheel can be rotated relative to its support member. The shaft, retention features and bore are sized such that the adequacy of the assembly can be determined in-process due to the tendency for the idler wheel to become dislodged from its support member during subsequent handling unless the retention features are properly deployed as a result of the tapered shaft being completely assembled with its bore. Additional features of the invention are that minimal resistance to installation will occur only at the very end of installation, during which time the retention features pass through the minimum diameter of the bore, and that the moldability of the idler wheel as a one-piece unit is enhanced by the tapered shapes of the shaft and its corresponding bore.

13 Claims, 1 Drawing Sheet

IDLER WHEEL WITH TAPERED SHAFT

The present invention generally relates to idler wheels, such as idler gears and pulleys having integrally-formed mounting shafts. More particularly, this invention relates to an idle wheel equipped with a tapered shaft which is configured to be assembled with an appropriately-shaped aperture in a support structure, so as to enhance the reliability of the assembly while also facilitating the assembly of the idler wheel with the support structure.

BACKGROUND OF THE INVENTION

Gears, pulleys, and various other power transmission members formed from engineering plastics offer certain advantages over their metal counterparts, including lower weight and potentially lower manufacturing and material costs. As is known in the prior art, the manufacturing of plastic gears and pulleys can be simplified by integrally forming a shaft by which the gear or pulley is rotatably supported and secured to an appropriate frame, housing or any other suitable support structure. Shafts for idler wheels, which generally include idler gears, sprockets and pulleys, are often formed to include a feature which will retain the wheel to its support structure, yielding an idler wheel assembly which can be readily manufactured and assembled in mass production.

Illustrated in FIG. 1 is an example of such an idler gear assembly 110. The assembly 110 is composed of an idler gear 112 mounted to a support frame 114 by an integrally-formed shaft 116 received in an appropriately sized bore 118 in the support frame 114. As shown, the shaft 116 extends from one surface of the idler gear 112 and defines the gear's axis of rotation. In order to allow the idler gear 112 to rotate freely, the support frame 114 includes a boss 120 which circumscribes the bore 118 so as to space the idler gear 112 from the facing surface 122 of the support frame 114. The shaft 116 is retained in the bore 118 by a pair of barbs 124 which engage the rear surface 126 of the support frame 114. If access to the rear surface 126 is prevented by the configuration of the support frame 114, the mounting of the idler gear 112 is rendered substantially tamper-proof in that the barbs 124 prevent the shaft 116 from being removed from the bore 118.

The above structure is generally known in the prior art, and yields an idler gear 112 which can be readily assembled with its support frame 114 by simply aligning the shaft 116 with the bore 118 and forcing the barbs 124 through the bore 118 until they are allowed to resiliently re-expand at the rear surface 126 of the support frame 114. However, the above structure does have certain disadvantages, including those which adversely effect the reliability and manufacturability of all such idler wheels. One critical aspect is that, during assembly, there is the possibility that the shaft 116 may not be sufficiently assembled with the support frame 112 in order to deploy the barbs 124 against the rear surface 126 of the support frame 114. Such circumstances are particularly possible if the interference between the barbs 124 and the bore 118 necessitates an assembly force which exceeds an anticipated upper process limit or capability. Such a possibility requires in-process inspections, which complicate processing and increase manufacturing costs. Due to the interference fit between the barbs 124 and the bore 118 of an incompletely assembled assembly 110, the idler gear 112 may appear properly secured to the support frame 114. However, once placed in service, the shaft 116 will eventually become dislodged from the bore 118.

Another disadvantage is that the molding of the idler gear 112 is complicated by the requirement for the barbs 124 to resiliently withstand significant compression during the assembly process as they travel the full length of the bore 118. Such a requirement necessitates certain design tradeoffs between resiliency and strength of the barbs 124 under certain conditions. Furthermore, depending on the relative sizes of the bore 118 and the effective diameter of the barbs 124, the force required to assemble the idler gear 112 with the support frame 114 may be excessive, resulting in unacceptable damage to the idler gear 112 and/or the support frame 114.

Thus, it would be desirable to provide a relatively low cost idler wheel assembly which can be readily assembled in mass production, and is configured to enable its reliability to be easily and dependably ascertained immediately after assembly. In addition, such an idler wheel assembly would require a minimal assembly force in order to mount the idler wheel to its support member, and also provide for enhanced moldability of the idler wheel and its shaft.

SUMMARY OF THE INVENTION

It is an object of this invention to provide an idler wheel assembly which can be readily manufactured and assembled in mass production.

It is another object of this invention that an idler wheel for such an assembly be readily moldable from an engineering plastic material.

It is a further object of this invention that such an idler wheel include an integrally-formed tapered shaft which is sized and shaped to closely assemble with a tapered bore formed in a suitable support frame.

It is a yet another object of this invention that such an idler wheel require minimal force for assembling with the tapered bore of the support frame.

It is a yet a further object of this invention that the tapered shaft of such an idler wheel be configured so as to enable an in-process determination of the reliability of the assembly.

Lastly, it is still a further object of this invention that such an idler wheel assembly be substantially tamper-proof once assembled.

In accordance with a preferred embodiment of this invention, these and other objects and advantages are accomplished as follows.

According to the present invention, there is provided an idler wheel assembly that is particularly suitable for manufacture and assembly in mass production. The assembly includes an idler wheel, such as a gear, sprocket or pulley, which has a tapered shaft that is sized to closely mate with a similarly sized and tapered bore in a support member, such as a frame or similar structure. At the distal end of the tapered shaft is one or more resilient retention features which secure the shaft within the bore, yet enables the shaft to freely rotate within the bore such that the idler wheel can be rotated relative to its support member.

In accordance with this invention, the tapered shapes of the idler wheel and bore are configured such that the retention features must pass completely through the bore before the idler wheel can be retained to any significant degree to the support member. Consequently, the adequacy of the assembly can be determined in-process, due to the tendency for the idler wheel to become immediately dislodged from its support member when handled, unless the retention features are properly deployed as a result of the tapered shaft being completely assembled with its bore.

In a preferred embodiment of this invention, the tapered shaft and the retention features are integrally molded with the idler wheel. The moldability of the idler wheel as a one-piece unit from an engineering plastic material is enhanced by the tapered shapes of the shaft and its corresponding bore, in that the degree to which the retention features are deformed in order to pass completely through the bore are significantly reduced, yet will still result in the tapered shaft being reliably retained within the bore.

Furthermore, the shaft and retention features of the idler wheel and the bore of the support member are specifically configured to promote the ease with which the idler wheel is assembled with its support member. For this purpose, the tapered diameter of the shaft and the diameter defined by the retention features are sized to enable the shaft to be installed in the bore with a minimal installation force. Specifically, the shaft, the retention features and the bore are sized such that significant resistance to installation will not occur until the very end of installation, during which time the retention features pass through the minimum diameter of the bore.

Other objects and advantages of this invention will be better appreciated from the following detailed description.

BRIEF DESCRIPTION OF THE DRAWINGS

The above and other advantages of this invention will become more apparent from the following description when taken in conjunction with the accompanying drawings, wherein.

DETAILED DESCRIPTION OF THE INVENTION

Figure 2:
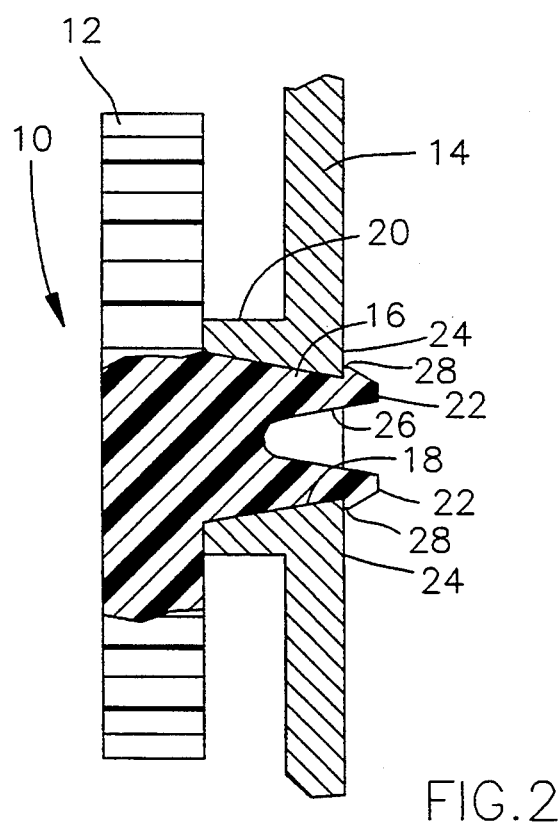
FIG. 2 is a partial cross-sectional view of an integrally-formed idler gear and shaft in accordance with a preferred embodiment of this invention, in which the idler gear and shaft are assembled to an appropriately configured support member.

Represented in FIG. 2 is an idler gear assembly 10 which is configured to facilitate its assembly, while also enhance the in-service reliability of the assembly 10. While this invention will be described below in terms of the idler gear assembly 10, those skilled in the art will recognize that the features and advantages of this invention are applicable to numerous other applications, including idler pulleys and other types of idler wheels for various power transmission systems. Consequently, the teachings of this invention are not to be construed as being limited to the specific embodiment described below and illustrated in the drawings.

As shown in FIG. 2, the idler gear assembly 10 includes an idler gear 12 mounted to its corresponding support frame 14 with a shaft 16. As is known in the art, the idler gear 12 may be employed in mesh with two or more gears (not shown) in order to transfer motion from one of the gears to the other gear, such that both gears have the same direction of rotation. If employed in a chain drive, the idler gear 12 is more accurately a sprocket, and is used to take up slack in a chain in mesh with two or more additional sprockets. The idler gear 12 is not driven through its shaft 16, but instead is driven through its teeth, such that the shaft 16 is configured to rotate freely within a bore 18 formed in the support frame 14. A boss 20 is formed on the support frame 14 in order to space apart the facing surfaces of the idler gear 12 and the support frame 14, so as to promote the ability of the idler gear 12 to freely rotate relative to the support frame 14.

In accordance with the preferred embodiment of this invention, the shaft 16 is shown in FIG. 2 as being integrally formed with the idler gear 12 so as to form a unitary component. The idler gear 12 is preferably formed from a suitable high strength engineering plastic such as acetal, though other plastic materials used to make gears could also be used, including polycarbonate and polyester. As such, the idler gear 12, including its shaft 16, can be formed by machining, though injection molding will generally offer a more economic approach to its manufacture in mass production. Though shown as an integral portion of the idler gear 12, the shaft 16 may be formed separately and mechanically or adhesively joined to the idler gear 12 if preferred or necessary.

As is apparent from FIG. 2, the shaft 16 is tapered, such that its diameter adjacent the idler gear 12 is greater than its diameter adjacent its distal end. Likewise, the bore 18 formed in the support frame 14 is also tapered such that the shaft 16 and the bore 18 closely conform to each other when the idler gear 12 is properly assembled with the support frame 14. A preferred angular taper for the shaft 16 and bore 18 will depend in part on the lengths and diameters of the shaft 16 and bore 18. An angular taper of about ten degrees to the axes of the shaft 16 and the bore 18 has been found to be suitable in practice for idler gears on the order of about twenty-five millimeters (one inch) in diameter, though it is entirely foreseeable that this angle could be varied considerably to satisfy certain assembly and design requirements. The appropriate diametral clearance between the shaft 16 and the bore 18 will also vary, depending on the diameter of the shaft 16 and bore 18, the materials used for each, as well as other factors known to those skilled in the art.

Formed to extend substantially radially from the shaft 16 are two or more retention features, such as the barbs 22 shown. The barbs 22 engage a radial shoulder 24 which is formed by the support frame 14 and circumscribes the bore 18. Though shown as being located at the distal end of the shaft 16, the shaft 16 could be of any suitable length, and the barbs 22 could be formed at any appropriate position along the length of the shaft 16 in order to appropriately engage the radial shoulder 24 or any other appropriate surface or feature, whether or not formed by the support frame 14. The barbs 22 serve to secure the shaft 16 within the bore 18, so as to secure the idler gear 12 to the support frame 14. The barbs 22 enable the idler gear 12 to be assembled with the support frame 14 with a simple push-through action which requires only a moderate force. Yet, if access to the radial shoulder 24 is prevented by the configuration of the support frame 14, the mounting of the idler gear 12 is rendered substantially tamper-proof in that the shaft 16 cannot be removed from the bore 18 without seriously damaging the idler gear 12 and/or the support frame 14. A diametral slot 26 is disposed axially through the distal end of the shaft 16 in order to allow the barbs 22 to more readily flex during installation as the barbs 22 are forced through the bore 18.

Figure 1:
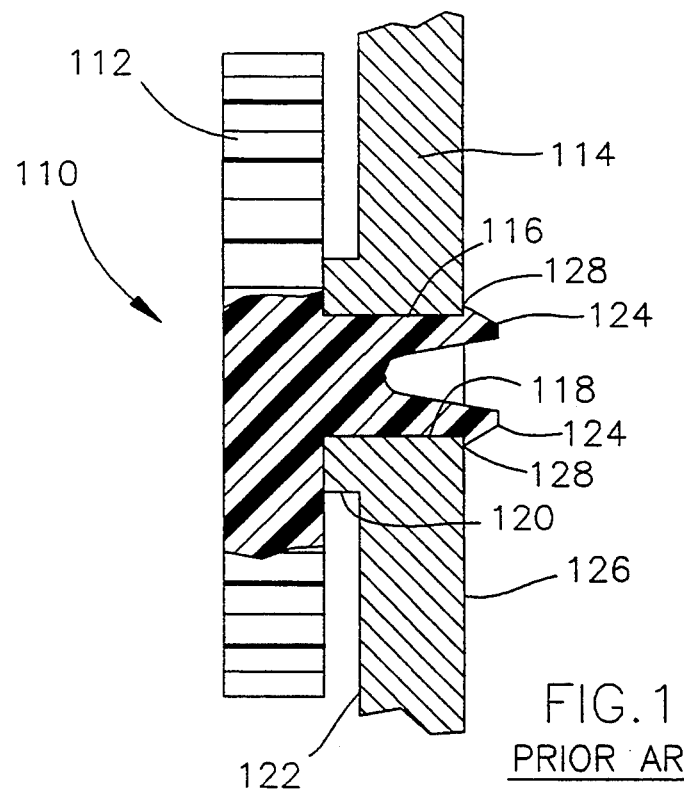
FIG. 1 is a partial cross-sectional view of a prior art integrally-formed idler gear and shaft as assembled to a support member.

As illustrated in FIG. 2, the radial tip of each barb 22 terminates in a flat 28, as opposed to the sharp corner 128 shown for the prior art idler gear 112 of FIG. 1. It has been determined that the molding process capability of the idler gear assembly 10 of this invention is enhanced by the presence of the flat 28 on the radial tip of each barb 22, in that conventional molding processes are generally unable to maintain a sharp corner over successive molding operations due to residue accumulating on the mold. As a result, repeated molding operations eventually lead to a much rounded tip that significantly reduces the diametral width defined by the barbs 22, as measured in a direction transverse to the axis of the shaft 16. Accordingly, close monitoring via statistical process control is required in order to avoid the production of rounded and undersized barbs 22 which could allow the idler gear 12 to become easily dislodged from the bore 18, even if properly and completely assembled.

As a particular feature of this invention, the reliability of the idler gear assembly 10 is promoted by the tapered shaft and bore design of this invention. As is apparent from FIG. 2, the tapered shapes of the shaft 16 and bore 18 are sized such that the barbs 22 must pass completely through the bore 18 and engage the radial shoulder 24 before the idler gear 12 can be secured to any significant degree to the support frame 14. If the shaft 16 is only partially installed, the barbs 22 will be compressed to a lesser degree than if the bore 18 were straight. Consequently, there will be less interference between the barbs 22 and the bore 18 and a tendency for the shaft 16 to become easily separated from the bore 18 with little or no handling after assembly. The taper of the bore 18 will actually urge loosening of the shaft 16 with the bore 18, such that the integrity of the assembly 10 can be easily determined in-process by, under some circumstances, relying solely on normal handling of the assembly. At a minimum, proper assembly of the shaft 16 with the bore 18 can be determined with minimal interruption of the manufacturing process.

In addition, the force required to assemble the idler gear 12 with the support frame 14 is significantly less than that for a comparably-sized idler gear having a straight shaft, such as that shown in FIG. 1. Specifically, the shaft 16 and the barbs 22 are particularly configured to promote the ease with which the barbs 22 can be forced through the bore 18. For this purpose, the tapered diameter of the shaft 16 and the diametral width of the barbs 22 are sized to enable the shaft 16 to be installed in the bore 18 with a minimal installation force. The diameter of the barbs 22 is preferably less than the maximum diameter of the shaft 16, which corresponds to the maximum diameter of the bore 18. As such, significant resistance to installation will not occur until the very end of installation, during which time the barbs 22 are required to pass through the minimum diameter of the bore 18, located adjacent the radial shoulder 24 of the support frame 14. In practice, it has been found that the installation force to properly assemble the idler gear 12 with its support frame 14 can be more than about twenty percent less than a comparably-sized idler gear of the same material and size, such as that represented in FIG. 1.

As a result of the above, the level of stress imposed on the shaft 16 during installation is also significantly reduced. As such, the moldability of the idler gear 12 and its shaft 16 is significantly enhanced, in that disparities between the required resiliency and strength of the shaft 16 and its barbs 22 are not as significant. As noted previously, the molding process capability for the barbs 22 is also enhanced by the presence of the flats 28 formed at the radial tip of each barb 22. As an added advantage, the smaller diameter of the barbs 22 as compared to the maximum diameter of the bore 18 serves to guide the shaft 16 into the bore 18, and thereby facilitates the assembly of the idler gear 12 with the support frame 14.

From the above, it can be seen that the idler gear assembly 10 of this invention can be more easily assembled and is significantly more reliable than idler wheel assemblies of the prior art. In accordance with this invention, the shaft 16, the bore 18 and the barbs 22 are specifically configured to promote the ease with which the idler gear 12 is assembled with its support frame 14. More specifically, the shaft 16 and the bore 18 are both tapered, so as to enable the shaft 16 to be installed in the bore 18 with a significantly reduced installation force.

Furthermore, the tapered shapes of the shaft 16 and the bore 18 necessitate that the barbs 22 must pass completely through the bore 18 before the idler gear 12 will be positively retained to the support frame 14. Consequently, the reliability of the idler gear assembly 10 can be determined in-process due to the tendency for the idler gear 12 to become dislodged from its support frame 14 during subsequent handling unless the barbs 22 are properly deployed against the radial surface 24 of the support frame 14 as a result of the shaft 16 being completely assembled with its bore 18.

Finally, the tapered shaft 16 and the barbs 22 can be integrally molded with the idler gear 12 from a suitable engineering plastic. The moldability of the idler gear 12 as a one-piece unit is significantly enhanced as a result of reduced stresses being imposed on the shaft 16 and barbs 22 while the barbs 22 are forced to pass completely through the bore 18. Specifically, compression forces on the barbs 22 are not imposed at all while the shaft 16 is initially being inserted into the bore 18, and maximum stresses are sustained by the shaft 16 only during the final phase of assembly in which the barbs 22 are passing through the minimum diameter of the bore 18. Consequently, the required mechanical strength of the shaft 16 is less than that for a similarly-sized conventional shaft.

While our invention has been described in terms of a preferred embodiment, it is apparent that other forms could be adopted by one skilled in the art. For example, other appropriate materials could be substituted for these disclosed, retention features other than the barbs 22 illustrated could be used to retain the shaft 16 in the bore 18, and the idler gear 12 could be any other type of idler wheel, including idler sprockets and idler pulleys. Accordingly, the scope of our invention is to be limited only by the following claims.

The embodiments of the invention in which an exclusive property or privilege is claimed are defined as follows:

1. A member adapted to be rotatably mounted to a tapered aperture formed in a support member, said member comprising:

a tapered shaft extending from a surface of said member along an axis of rotation of said member, said tapered shaft having a first portion adjacent said surface and a second portion spaced apart from said surface of said member, said first portion having a diameter which is larger than a diameter of said second portion;

means formed adjacent said second portion of said tapered shaft for resiliently securing said tapered shaft in said tapered aperture.

2. A member as recited in claim 1 wherein said securing means defines a width which is substantially transverse to said axis of rotation of said member, said width being greater than a minimum diameter of said tapered aperture of said support member.

3. A member as recited in claim 1 wherein said diameter of said first portion is larger than a width defined by said securing means which is substantially transverse to said axis of rotation of said member.

4. A member as recited in claim 1 wherein said tapered shaft is integrally formed with said member.

5. A member as recited in claim 1 wherein said securing means comprises at least two barbs extending radially from said tapered shaft.

6. A member as recited in claim 1 wherein said tapered shaft is formed from a polymeric material.

7. An idler gear as recited in claim 1 wherein said second portion is a distal end of said tapered shaft.

8. An idler wheel having an integrally-formed tapered shaft for rotatably mounting said idler wheel to a tapered aperture formed in a support member, wherein said tapered shaft comprises:

a portion spaced apart from said idler wheel, said portion having a diameter which is smaller than a diameter of said tapered shaft adjacent said idler wheel;

means formed adjacent said portion of said tapered shaft for resiliently securing said tapered shaft to said tapered aperture, said securing means defining a width substantially transverse to an axis of said tapered shaft which is larger than a minimum diameter of said tapered aperture.

9. An idler wheel as recited in claim 8 wherein said diameter of said tapered shaft adjacent said idler wheel is larger than said width of said securing means.

10. An idler wheel as recited in claim 8 wherein said securing means comprises at least two barbs extending radially from said tapered shaft.

11. An idler wheel as recited in claim 8 wherein said tapered shaft is formed from a polymeric material.

12. An idler wheel as recited in claim 8 wherein said portion is a distal end of said tapered shaft.

13. An idler gear assembly comprising:

a support member having a tapered aperture formed therein and a radially-extending shoulder formed at a minimum diameter portion of said tapered aperture;

an idler gear having an integrally-formed tapered shaft rotatably mounting said idler gear to said tapered aperture of said support member;

a distal end of said tapered shaft opposite said idler gear, said distal end having a diameter which is smaller than a diameter of said tapered shaft adjacent said idler gear;

an axially extending diametral slot formed in said distal end of said tapered shaft so as to enable said distal end to resiliently contract radially; and a plurality of members formed at said distal end of said tapered shaft and engaged with said radially-extending shoulder of said support member so as to secure said tapered shaft within said tapered aperture, said diameter of said tapered shaft adjacent said idler gear being larger than a width defined by said plurality of members which is substantially transverse to an axis of rotation of said idler gear.

* * * * *